US009293450B2

(12) United States Patent
Maziasz (10) Patent No.: US 9,293,450 B2
(45) Date of Patent: Mar. 22, 2016

(54) SYNTHESIS OF COMPLEX CELLS

(71) Applicant: Freescale Semiconductor, Inc., Austin, TX (US)

(72) Inventor: Robert L. Maziasz, Austin, TX (US)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 7 days.

(21) Appl. No.: 14/338,317

(22) Filed: Jul. 22, 2014

(65) Prior Publication Data
US 2016/0027768 A1  Jan. 28, 2016

(51) Int. Cl.
| | |
|---|---|
| G06F 17/50 | (2006.01) |
| G06F 9/455 | (2006.01) |
| H01L 27/02 | (2006.01) |
| H01L 27/088 | (2006.01) |
| H01L 23/528 | (2006.01) |
| H01L 23/50 | (2006.01) |
| G03F 1/00 | (2012.01) |

(52) U.S. Cl.
CPC .............. *H01L 27/0207* (2013.01); *G03F 1/00* (2013.01); *G06F 17/505* (2013.01); *G06F 17/5072* (2013.01); *H01L 23/50* (2013.01); *H01L 23/528* (2013.01); *H01L 27/088* (2013.01)

(58) Field of Classification Search
CPC ............ G06F 17/5045; G06F 17/5068; G06F 17/505; G06F 17/5072; G06F 2217/12; G06F 17/50; G06F 2217/06; H01L 27/0203; H01L 2924/14; H01L 29/78645; H03K 19/20
USPC ............................ 716/103, 104, 105, 139, 55
See application file for complete search history.

(56) References Cited

U.S. PATENT DOCUMENTS

| | | | | |
|---|---|---|---|---|
| 5,517,421 | A * | 5/1996 | Jimbo ................. | G06F 17/5045 716/103 |
| 5,712,792 | A * | 1/1998 | Yamashita ............ | G06F 17/505 716/101 |
| 5,801,958 | A * | 9/1998 | Dangelo .......... | G01R 31/31704 716/102 |
| 5,984,510 | A * | 11/1999 | Guruswamy ....... | G06F 17/5068 716/104 |
| 5,987,086 | A * | 11/1999 | Raman ................ | G06F 17/5077 716/120 |
| 5,995,734 | A * | 11/1999 | Saika .................. | G06F 17/5068 716/119 |
| 6,006,024 | A * | 12/1999 | Guruswamy ....... | G06F 17/5068 716/126 |
| 6,014,506 | A * | 1/2000 | Hossain .............. | G06F 17/5072 716/103 |
| 6,077,308 | A * | 6/2000 | Carter ................. | G06F 17/5068 716/103 |
| 6,209,123 | B1 | 3/2001 | Maziasz et al. | |

(Continued)

OTHER PUBLICATIONS

Tani et al., "Two-Dimensional Layout Synthesis for Large-Scale CMOS Circuits," Computer-Aided Design, 1991. ICCAD-91. Digest of Technical Papers., 1991 IEEE International Conference on, On pp. 490-493.

(Continued)

*Primary Examiner* — Helen Rossoshek
(74) *Attorney, Agent, or Firm* — Fogarty, L.L.C.

(57) ABSTRACT

Hierarchical layout synthesis of complex cells. In some embodiments, a method may include partitioning a cell into a plurality of subcells, where the cell represents a set of electronic components in an integrated circuit; identifying, among the plurality of subcells, a most complex subcell; synthesizing a layout of the most complex subcell for each of one or more side-port configurations; selecting a side-port configuration based upon the layout of the most complex subcell; and synthesizing a layout of one or more of the plurality of subcells neighboring the most complex subcell by propagating one or more constraints associated with the selected side-port configuration.

17 Claims, 7 Drawing Sheets

(56) References Cited

U.S. PATENT DOCUMENTS

| | | | | |
|---|---|---|---|---|
| 6,295,636 B1* | 9/2001 | Dupenloup | G06F 17/5045 | 716/103 |
| 6,301,687 B1* | 10/2001 | Jain | G01R 31/318357 | 716/107 |
| 6,324,678 B1* | 11/2001 | Dangelo | G01R 31/31704 | 716/103 |
| 6,421,818 B1* | 7/2002 | Dupenloup | G06F 17/5045 | 716/105 |
| 6,836,877 B1* | 12/2004 | Dupenloup | G06F 17/5045 | 716/103 |
| 7,055,113 B2* | 5/2006 | Broberg, III | G06F 17/505 | 716/102 |
| 7,080,344 B2* | 7/2006 | Bajuk | G06F 17/5068 | 716/103 |
| 7,137,092 B2* | 11/2006 | Maeda | G06F 17/5068 | 257/E27.107 |
| 7,225,423 B2* | 5/2007 | Bhattacharya | G06F 17/5045 | 716/102 |
| 7,257,799 B2* | 8/2007 | McKenney | G06F 17/5045 | 716/117 |
| 7,343,581 B2* | 3/2008 | Becker | G06F 17/505 | 716/104 |
| 7,451,426 B2* | 11/2008 | Pribbernow | G06F 17/5045 | 326/37 |
| 7,600,211 B1* | 10/2009 | Goldberg | G06F 17/5045 | 716/104 |
| 7,784,013 B2* | 8/2010 | Motiani | G06F 17/5045 | 716/103 |
| 7,827,516 B1* | 11/2010 | Moe | G06F 17/5045 | 716/119 |
| 7,966,598 B2* | 6/2011 | Polomik | G06F 17/5077 | 716/105 |
| 8,024,693 B2* | 9/2011 | Adams | G06F 17/505 | 716/104 |
| 8,136,062 B2* | 3/2012 | Steinmetz | G06F 17/505 | 716/104 |
| 8,375,345 B1* | 2/2013 | Barowski | G06F 17/5045 | 716/104 |
| 8,458,629 B2* | 6/2013 | Caldwell | G06F 17/505 | 716/101 |
| 8,484,594 B2 | 7/2013 | Kucar et al. | | |
| 8,560,983 B2* | 10/2013 | Brandt | G06F 17/5068 | 716/101 |
| 8,640,063 B1* | 1/2014 | El-Maleh | G06F 17/505 | 716/104 |
| 8,656,325 B2* | 2/2014 | Barwin | G06F 17/5068 | 716/100 |
| 8,756,541 B2* | 6/2014 | Cho | G06F 17/5072 | 716/104 |
| 8,789,004 B2* | 7/2014 | Chen | G06F 17/5045 | 716/107 |
| 8,978,004 B2* | 3/2015 | Maziasz | G06F 17/5068 | 716/126 |
| 2002/0057109 A1* | 5/2002 | Yamashita | G06F 17/505 | 326/113 |
| 2002/0069396 A1* | 6/2002 | Bhattacharya | G06F 17/5045 | 716/102 |
| 2004/0140483 A1* | 7/2004 | Yonemaru | H01L 27/0207 | 257/204 |
| 2007/0143716 A1 | 6/2007 | Maziasz et al. | | |
| 2010/0058272 A1* | 3/2010 | Bowers | G06F 17/505 | 716/126 |
| 2011/0179395 A1* | 7/2011 | Smirnov | G06F 17/505 | 716/126 |
| 2014/0077300 A1* | 3/2014 | Noel | H01L 27/1108 | 257/351 |
| 2014/0337811 A1* | 11/2014 | Knapp | G06F 17/505 | 716/104 |

OTHER PUBLICATIONS

Ong et al., "GENAC: An Automatic Cell Synthesis Tool," Design Automation, 1989. 26th Conference on, On pp. 239-244.

Hsieh et al., "LiB: A CMOS Cell Compiler," Computer-Aided Design of Integrated Circuits and Systems, IEEE Transactions on (vol. 10, Issue: 8), 1991, On pp. 994-1005.

* cited by examiner

SYNTHESIS OF COMPLEX CELLS

FIELD

This disclosure relates generally to electronic circuit design, and more specifically, to the hierarchical layout synthesis of complex cells.

BACKGROUND

A common method for creating an integrated circuit (IC) involves an IC designer receiving a behavioral circuit model describing the desired functionality of the IC as well as a library of standard circuit cells. In many cases, the designer may operate a computer-aided design (CAD) system and may use the library of standard cells to build the IC based upon the behavioral circuit.

First, the designer determines which particular cells are needed for the IC. These cells represent actual physical circuits in the IC, and may include fundamental logic gates such as OR, NAND, NOR, AND, XOR, inverters, and other logical cells with an array of logic gate sizes. Then the designer reviews the behavioral circuit, either manually or automatically, to identify the particular cells required. Once the required logical cells are determined, the designer creates or retrieves a base logical cell structure for each cell type. Each base logical cell structure contains logical representations of transistors and other cell elements required to perform the particular logic functions of the cell. The base logical cell structure includes two-dimensional geometric data representing expected dimensions of the transistors and structures.

Thereafter, the designer couples the selected cells together via a graphical interface to create physical cell structures. In some cases, the designer also determines the physical placement of transistors and other cell elements within each logical cell structure, and identifies the conductive routing between the transistors and elements to form the required logic gates. Today at least portion of these placement and routing operations, collectively referred to as "layout operations," may be performed automatically via the CAD system.

The inventor hereof has recognized, however, that it is very difficult and time-consuming to create high quality layouts for complex standard cells, such as flip-flops, either manually or by automated layout synthesis tools. Although automated tools can create such layouts much quicker than manual processes, the quality of automated layouts is typically lower than manually created layouts, especially in terms of the silicon area used.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

DETAILED DESCRIPTION

In some embodiments, the systems and methods described herein enable an IC designer to employ an automated layout synthesis tool to create complex cell layouts that have quality equal to or higher than cells designed using manual methods, and in a much more efficient manner. Specifically, certain systems and methods described herein address what the inventors have identified as one of the main problems with conventionally synthesized complex cell layouts—that is, the layout for the most complex subcell in the whole layout has suboptimal quality.

To address this, and other problems, techniques described herein first identify the most complex subcell, determines all simple, feasible side-port constraints for it within the constraints of its neighbor subcells, and synthesizes the layout of this most complex subcell all the way down to GDSII ("Graphic Database System II"), or some other suitable file format, to ensure that height and width are accurately measured and optimized. The side-port configurations for a best solution of the complex subcell are propagated to their neighboring subcells to ensure that their layouts are compatible with the complex subcell and that the whole layout is high quality.

Figure 1:
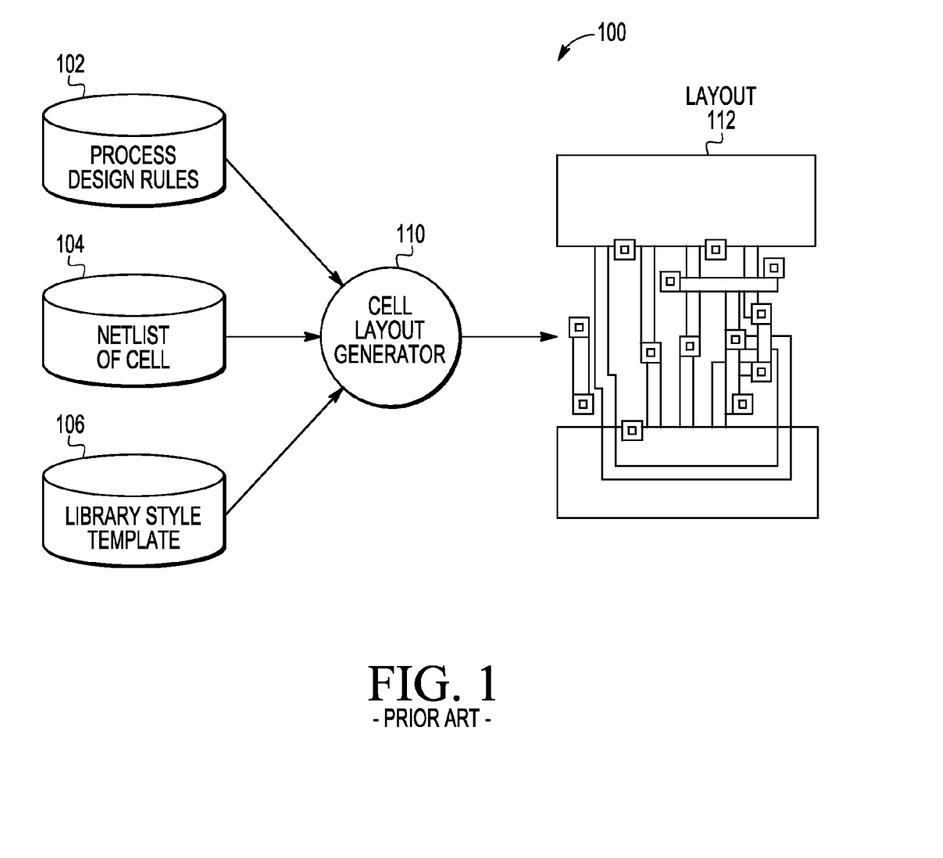
FIG. 1 is a block diagram that illustrates a cell layout generation system, according to some embodiments.

FIG. 1 is a block diagram that illustrates layout generation system 100. As illustrated, process design rules, stored in disk file 102, are provided to cell layout generator 110. Additionally, a netlist of cells stored in disk file 104, and a library style template stored in disk file 106 are also provided to cell layout generator 110. Cell layout generator 110 processes each of the parameters and values to generate layout 112. As used here, the term "cell" refers to a representation of a set of physical, electronic components in an IC or device. To provide a basic background for the description that follows, each of the input process design rules, netlist of cells, and library style template will be described in further detail.

Process design rules in disk file 102 may include a minimum width of the different layers used in a layout of a cell as well as spacing requirements associated with those layers. The process design rules may also specify electrical characteristics such as resistance and capacitance for each layer. The netlist of cells stored in data file 104 may include a list of transistor and signals connected to each of those transistors. Furthermore, the netlist of cells stored in disk file 104 may specify the size of transistors implemented in the layout and the input/output (I/O) signal ports.

It should be noted that the list of transistors specified in the netlist of cells represents a logical, and not a physical, netlist. Thus, systems and methods described herein may involve specifying connections, but does not always require an actual physical netlist. The library style template stored in disk file 106 may include required cell height, required well height, and the dimensions and locations of the supply sources, or rails, of the cell layout. Additionally, there are other styles specified in the template; however, these are not specified herein for brevity's sake and it should be realized that additional styles may be implemented even though they are not discussed in detail herein.

Before describing the operations of cell layout generator 110 in greater detail, a system in which cell layout generator 110 is implemented will be described. This system is illustrated in greater detail in FIG. 2.

Figure 2:
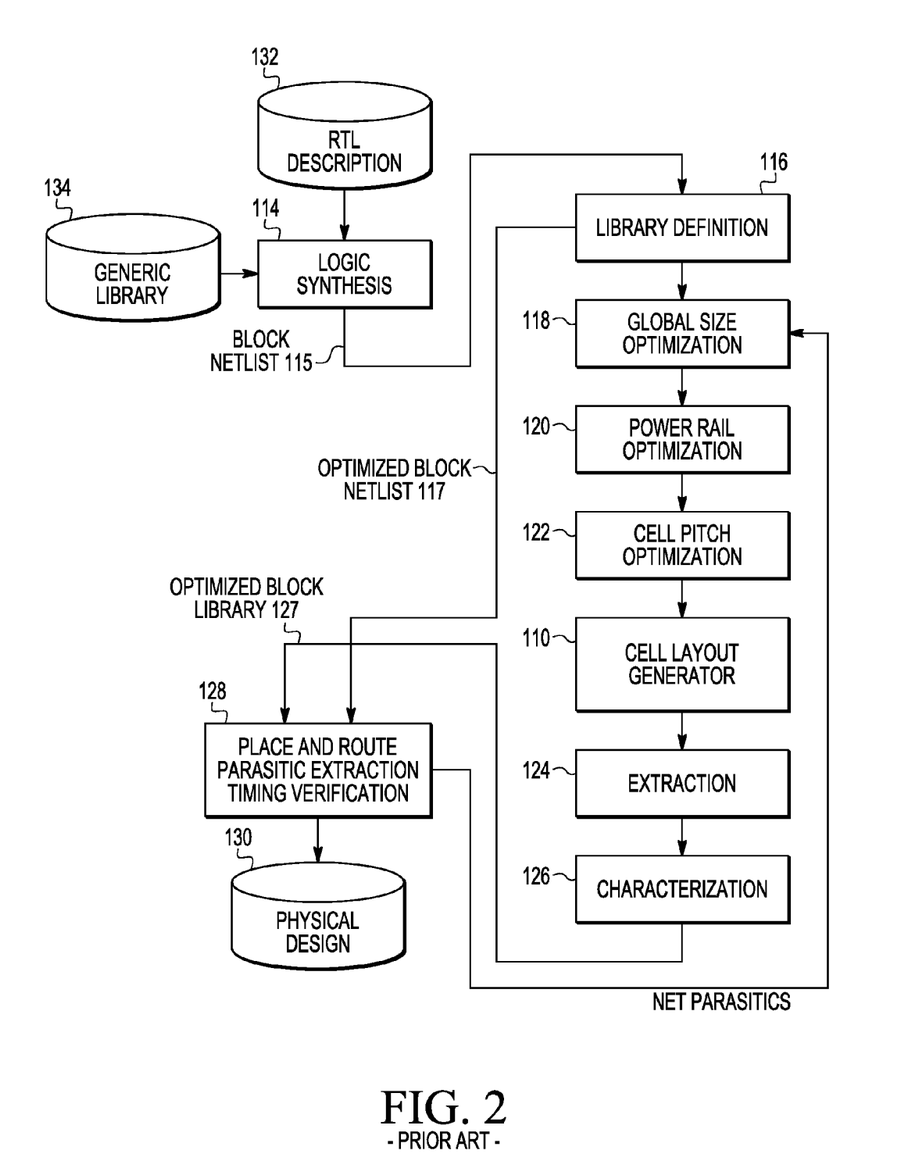
FIG. 2 is a block diagram that illustrates a design flow, according to some embodiments.

The content of a generic cell library stored in disk file 134 and a register transfer level (RTL) description, also known as a behavioral description, stored in disk file 132 are provided to logic synthesis tool 114. Generic cell library 134 provides descriptions of the basic building blocks of any design. Logic synthesis tool 114 generates a gate level description of the circuit indicated in the RTL description.

Together with the RTL description, logic synthesis tool 114 generates a gate level block netlist 115. Block netlist 115 uses the cells provided by the generic cell library stored in disk file 134 to implement the behavior of the circuit to be designed. Block netlist 115 is provided to library definition tool 116. In library definition tool 116, portions of block netlist 115 are combined to form a new hybrid set of cells. The new set of cells is represented by a hybrid netlist referred to as optimized block netlist 117. Optimized block netlist 117 is provided to a place and route, parasitic extraction, and timing verification tool 128. From library definition tool 116, optimized block netlist 117 is provided to global size optimization tool 118.

In global size optimization tool 118, the size of the individual transistors in the optimized block netlist is altered to satisfy the performance requirements specified in the RTL description provided by disk file 132. Global size optimization tool 118 subsequently provides size netlist 119 to power rail optimization tool 120. Power rail optimization tool 120 decides the dimension of the supply rail for each of the cells to be generated based on the current requirements for the optimized block netlist 117. The power calculated by power rail optimization tool 120 together with a sized netlist generated by global size optimization tool 118 are both provided to cell pitch optimization tool 122 to determine an optimal cell height. Once the optimal cell height is known together with the sized netlist, cell layout generation may begin.

After cell layout generator 110 generates a layout, resistance and capacitance of all electrical nodes within that layout are extracted by extraction tool 124. This extracted information is provided to characterization tool 126 where the power consumption and performance of each circuit in block netlist 117 is determined and provided as optimized block library 127. Optimized block library 127 is provided to Place and Route, Parasitic Extraction, and Timing Verification tools 128. Place and Route, Parasitic Extraction, and Timing Verification tools 128 generate a physical implementation of a desired circuit. The physical design is stored in disk file 130. From tools 128, net parasitics are extracted and provided to a global size optimization tool 118. Global size optimization tool 118 uses the net parasitics to resize a netlist to further optimize performance of physical design 130.

Figure 3:
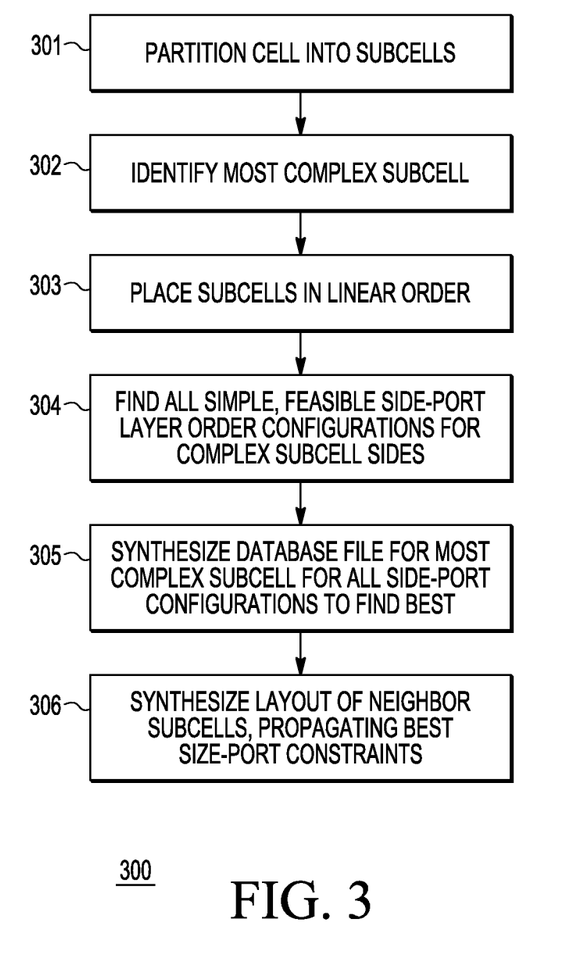
FIGS. 3 and 4 are flowcharts that illustrate methods for performing hierarchical layout synthesis of complex cells, according to some embodiments.

FIG. 3 is a flowchart that illustrates method 300 for performing hierarchical layout synthesis of complex cells. In some embodiments, method 300 may be performed, at least in part, by cell layout generator 110. At block 301, method 300 includes partitioning a cell such as, for example, a standard cell, into subcells. As used here, the term "standard cell" refers to a set of transistors and/or interconnects configured to provide known Boolean logic and/or storage functions. As such, examples of standard cells include, but are not limited to, AND, OR, NAND, NOR, and XOR gates, buffers, inverters, adders, multiplexers, flip-flops, etc.

At block 302, method 300 includes identifying the most complex one among the plurality of subcells. In some cases, the most complex subcell may be identified as the subcell having the largest number of transistors and/or interconnections. At block 303, method 300 includes placing the subcells in linear order, for example, starting from the most complex subcell and then moving farther from that subcell by decreasing amount of complexity (that is, from most to least degree of complexity), as illustrated below in connection with FIG. 5.

At block 304, method 300 includes finding all simple, feasible side-port layer order configurations for the most complex subcell's side(s). As used herein, the term side-port refers to an input/output (I/O) port on the side of a subcell such that it is configured to establish a connection between that subcell and other subcells (e.g., neighboring subcells). In some cases, to find all simple configurations, block 304 may aim to reduce or minimize the number of layer changes, and may move interconnections to adjacent regions only if necessary. In other words, configurations that do not stay within their respective native layers and/or configurations that do not stay within their respective native regions may be excluded. Moreover, to find all feasible configurations, block 304 may exclude side-port configurations that do not meet a maximum cell height requirement or the like.

At block 305, method 300 may include synthesizing the layout of the most complex subcell for all side-port configurations identified in block 304 in order to select the best such configuration. In some implementations, the best configuration may be one that meets the target standard cell height and has smallest width. Then, at block 306, method 300 may include synthesizing the layout of neighboring subcells while propagating constraints associated with the best side-port configuration. In some examples, the results of blocks 305 and/or 306 may be provided in the form of one or more GDSII file(s) or the like. In other cases, however, other database file formats for data exchange of IC layout artwork may be used.

Figure 4:
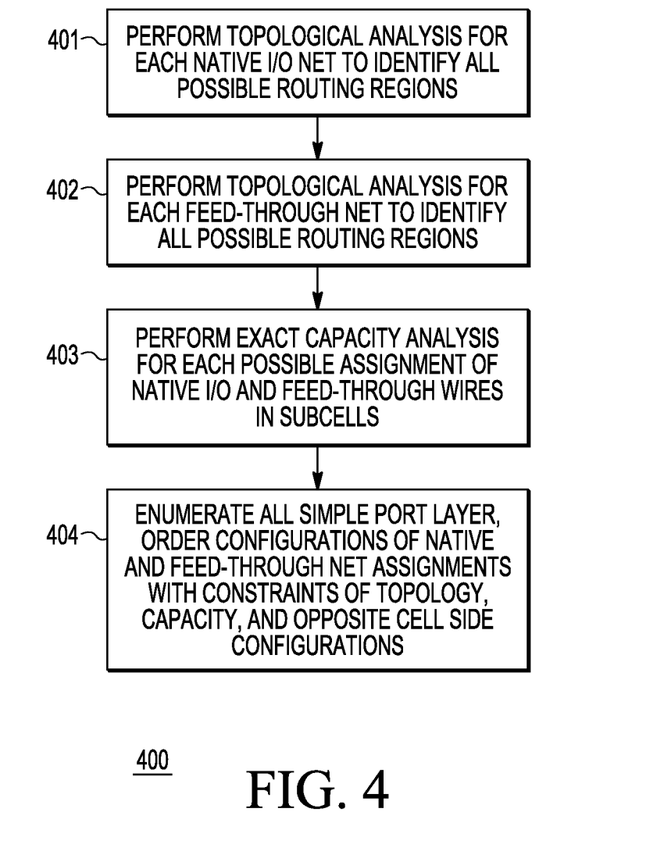

FIG. 4 is a flowchart that illustrates method 400 for identifying simple, feasible side-port layer order configurations for a given subcell. In some embodiments, method 400 may be performed as part of block 304 of FIG. 3. As shown, at block 401, method 400 may include performing topological analysis for each native I/O net to identify all possible routing regions. In some implementations, an I/O net of a subcell may be one that has connections to devices within the subcell and to other subcells. A net is native to each subcell to which it connects. The topological analysis of an I/O net of a subcell in block 401 may operate to determine routing paths available for connecting that I/O net from its internal connections to the subcell's sides. As such, the topological analysis may be performed in a pre-compacted version of the subcell so that only topological considerations, and not geometric considerations such as region capacity, constrain the available routing paths.

At block 402, another topological analysis may be performed for each feed-through net to identify all possible routing regions. A net that passes through a subcell from one side to the other without connecting to it is called a feed-through net for that subcell. The topological analysis of block 402 may operate to explore the different routing paths available to connect from one side of the subcell to the opposite side within the constraints of the side-port locations and layer assignments. The routing regions within the subcell that the feed-through is allowed to use may be limited to the regions of the side-ports and the regions immediately adjacent to these regions to avoid complex routing topologies internal to the subcell. Similarly, the layers available for the routing paths may be limited to those of the side-ports of a given feed-through net to avoid complex routing topologies.

At block 403, an exact capacity analysis is performed for every possible assignment of native I/O and feed-through wires in the subcells. Each assignment found during topological analysis may be individually checked for compatibility with the standard cell height constraint to ensure that the assigned routing region has sufficient geometric capacity. This compatibility checking operation may be done, for example, by performing a cell compaction to verify that it can meet the target height.

Then, at block 404, all simple port layer order configurations of native I/O and feed-through net assignments may be enumerated within constraints resulting from the topology and/or capacity analyses, and opposite cell side configurations. Although method 400 does not require any particular ordering of these configurations, they may be so ordered according to each configuration's primary characteristics or metrics, such as subcell width and height, for example. Such an ordering may be useful in a situation where it is desirable to terminate the synthesis process upon achieving a result of a given quality, such as minimum overall cell width, instead of processing all enumerated configurations exhaustively.

Figure 5:
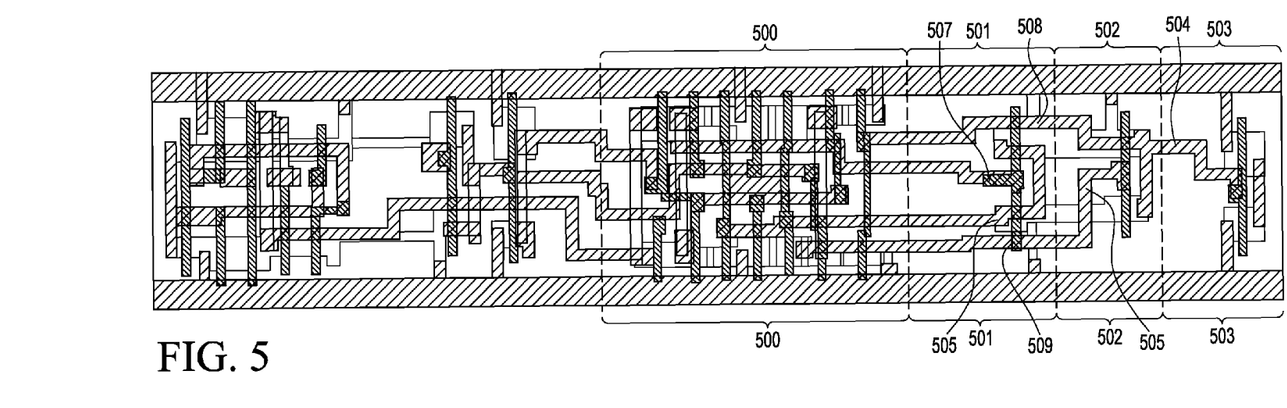
FIGS. 5 and 6 are layouts of a complex cell before and after final compaction, respectively, according to some embodiments.

FIG. 5 is a layout of a complex cell before final compaction according to some embodiments. To illustrate the hierarchical layout process in the context of method 300 of FIG. 3, in FIG. 5 the entire cell is split into a plurality of subcells, namely core subcell 500, left inverter subcell 501, middle inverter subcell 502, and right inverter subcell 503; as prescribed by block 301 of method 300. Core subcell 500 is identified as the most complex subcell in block 302, and other subcells 501-503 are placed in linear order according to block 303 of method 300. Each of subcells 501-503 includes a plurality of native and feed-through nets 504-509.

The operations of block 304 are then illustrated by method 400 of FIG. 4. Particularly, the topological analysis of block 401 identifies a PN region as a possible routing region for native net 504 in subcell 503; P, N, or PN regions as possible routing regions for native net 504 in subcell 502; a PN region as possible routing region for native net 505 in subcell 502; P or N regions as possible routing region for native net 506 in subcell 501; and a PN region as possible routing region for native net 507 in subcell 501. Then, the topological analysis of block 402 identifies feed-through nets 508 and 509 in subcell 501, as well as P, N, and PN routing regions.

With the assessments of blocks 401 and 403, block 403 then performs an exact capacity analysis of subcell 501, for example, which again identifies two native nets 506 and 507 as well as two feed-through nets 508 and 509. Part of the capacity analysis determines in this example that there are 24 topologically unique cases to be created and tested, excluding feed-through net assignments. However, only those that meet cell height requirements may be deemed feasible. Moreover, those that meet cell height requirements but have cell width significantly larger than minimum may also be excluded.

At block 404, a list of all simple and feasible port layer, order configurations may be provided. In this example, there are 48 maximum different port layer order configurations for the right side of core subcell 500, 6 maximum different port layer order configurations for the left side of core subcell 500, and therefore there are 288 maximum different total port layer order configurations for the whole core 500.

Using exhaustive numeration, there would be 18,432 different total port layer, order configurations for the whole core subcell 500. Specifically, the core subcell has three I/O nets on its left side and four on its right. Exhaustive enumeration would try all permutations of the side-ports in each available port layer. These permutations yield 3! and 4! for the two sides, respectively, and $2^3$ and $2^4$ for the all possible port layer assignments (assuming only one poly and one metal layer are needed) for left and right sides, respectively. (If a second metal layer is included for ports, the number gets much larger.) The product of these 4 numbers is 18,432.

But many of these configurations fail capacity analysis. Thus, the actual number of available configurations is much smaller, in the neighborhood of 30 to 50 total configurations. Particularly, the number of feasible port layer, order configurations is 6 for the left side and 48 for the right side, giving a total of 288, which is the product of these two numbers. It may be determined, however, that most of these configurations will not meet cell height and therefore only 30 to 50 of the 288 total possible configurations would pass the capacity analysis.

Figure 6:
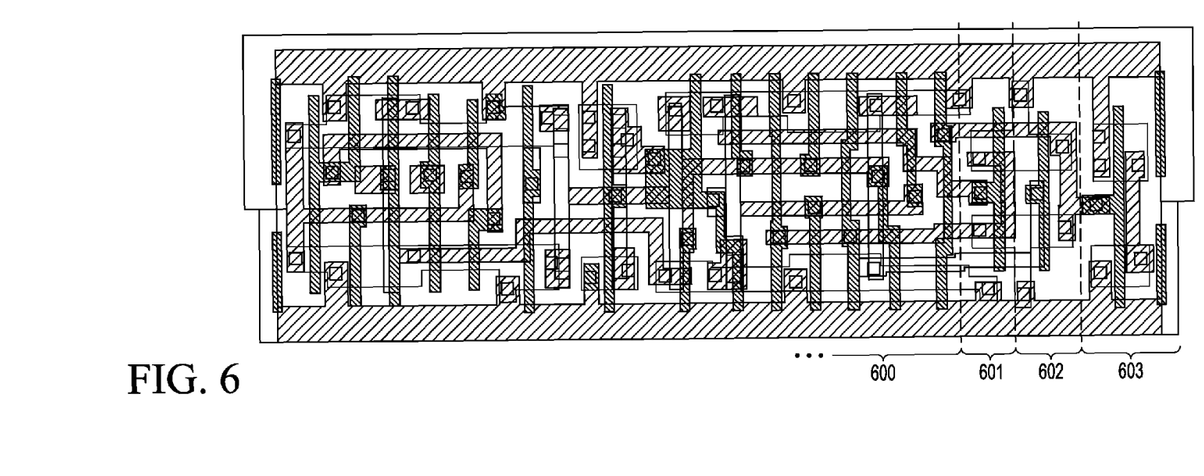

In that regard, FIG. 6 shows a layout of the complex cell after final compaction, with subcells 600-603 corresponding to subcells 500-503, respectively. All 288 feasible configurations are synthesized for the core subcell, along with neighboring subcells with compatible configurations. The layout for the whole cell is chosen based on its primary metrics, such as height and width.

Figure 7:
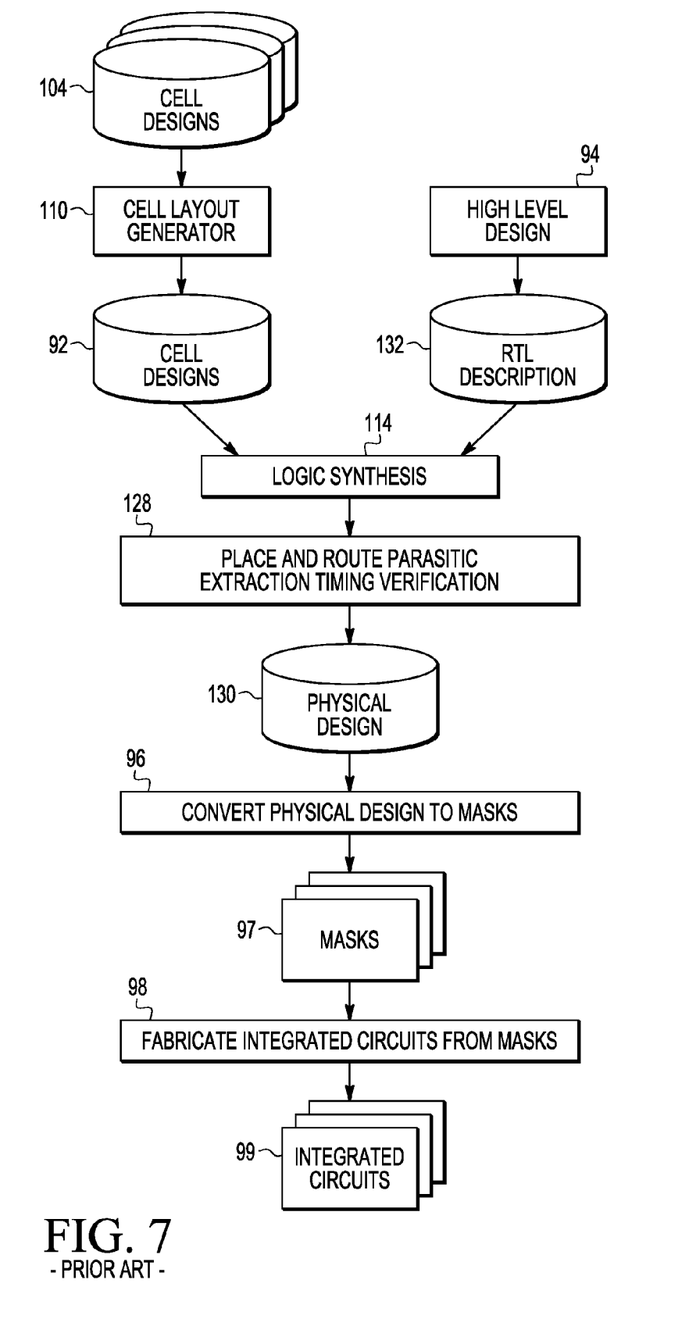
FIG. 7 is a block diagram that illustrates integrated circuit fabrication, according to some embodiments.

FIG. 7 is a block diagram that illustrates integrated circuit fabrication utilizing cell layout generation tool 110 previously illustrated in FIG. 3. Cell layout generator 110 uses cell netlists 104 to generate standard cell library 92. Each standard cell library 92 member is generated from one of cell netlists 104. High-level design tool 94 is used to generate a RTL circuit description 132. Logic synthesis tool 114 combined with Place and Route, Parasitic Extraction, and Timing Verification tools 128 generates physical design 130 from standard cell library 92 and RTL description 132.

Physical design file 130 includes integrated circuit dimensions, element dimensions, and element locations within the integrated circuit. Physical design file 130 locates elements and connections within a two-dimensional substrate area of an integrated circuit die. Preferably, physical design file 130 includes physical structure for performing the functions of an integrated circuit design from which the physical design file was derived. Physical design 130 is converted 96 into set of masks 97 corresponding to the layers in physical design file 130. Masks 97 are used to fabricate 98 integrated circuits 99.

The techniques discussed above herein are used to generate CAD (or "Computer Aided Design"), EDA (or "Electronic Design Automation) data files which contain information regarding the integrated circuit and placement of gates, transistors, and the like in the IC. These files are then used to form lithographic masks, which have geometric patterns that are then used to manufacture a plurality of ICs on a plurality of semiconductor wafers at an IC fabrication facility.

Figure 8:
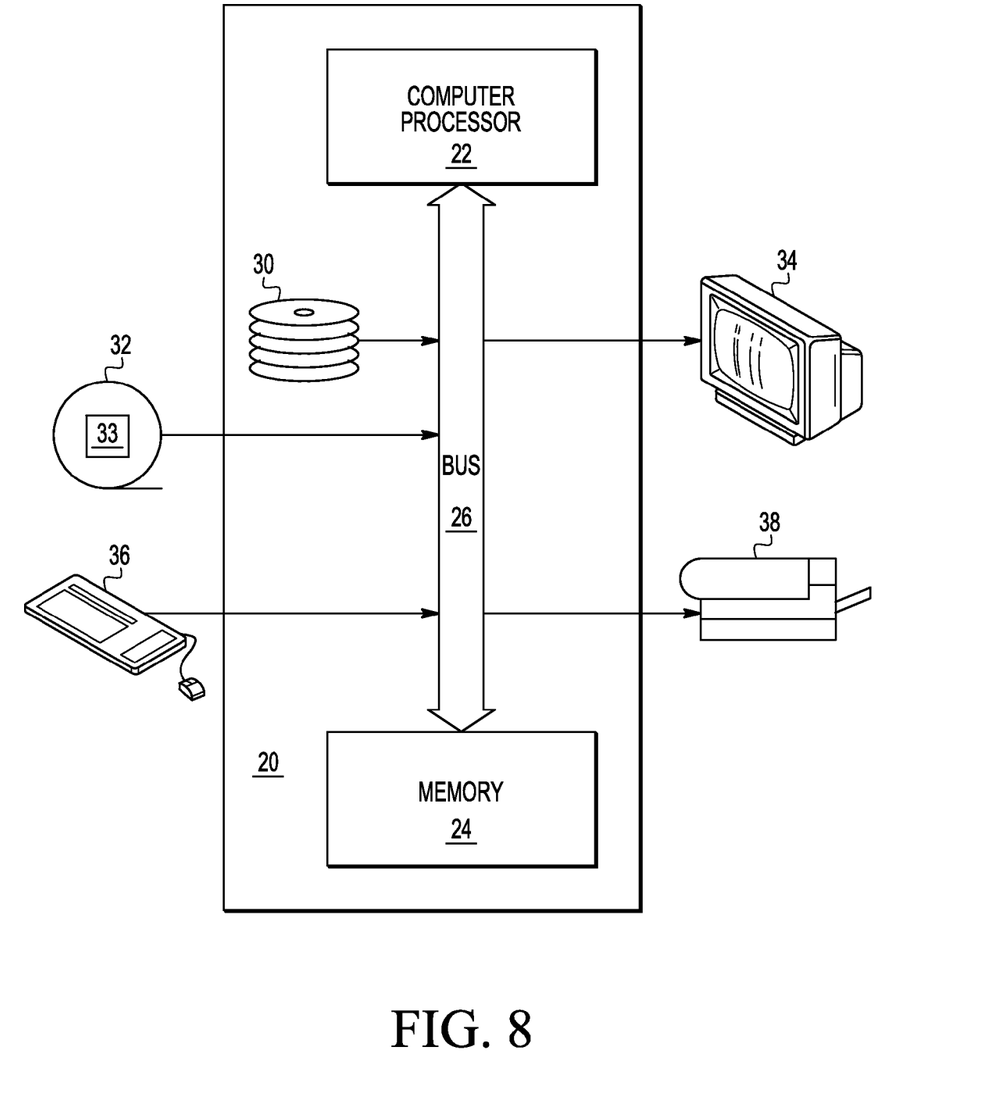
FIG. 8 is a block diagram that illustrates a computer system adapted to perform hierarchical layout synthesis of complex cells, according to some embodiments.

FIG. 8 is a block diagram illustrating general-purpose computer 20 configured to execute cell layout generator 110, for example. General-purpose computer 20 has processor 22 and memory 24, connected by bus 26. Memory 24 includes relatively high-speed machine readable media devices such as DRAM, SRAM, ROM, FLASH, EEPROM, and bubble memory. Also connected to bus 26 are secondary storage 30, external storage 32, output devices such as a monitor 34, and input devices such as a keyboard (with mouse) 36 and printers 38.

Secondary storage 30 includes machine-readable media devices such as hard disk drives, magnetic drum, and bubble memory. External storage 32 includes machine readable media devices such as floppy disks, removable hard drives, magnetic tape, CD-ROM, and even other computers, possibly connected via a communications line. The distinction drawn here between secondary storage 30 and external storage 32 is primarily for convenience. As such, it should be appreciated that there is substantial overlap between these elements.

Executable versions of computer software 33, such as the cell layout generator 110 can be written to, and later read from external storage 32 and loaded for execution directly into memory 24, or stored on secondary storage 30 prior to loading into memory 24 and execution. Also preferably stored on either secondary storage 30 or external storage 32 are process design rules 102, cell netlists 104, library style templates 106, optimized block library 127, physical design file 130, generic library 134, RTL description file 132, and standard cell library 92.

As described above, in an illustrative, non-limiting embodiment, a method may include partitioning a cell into a plurality of subcells, where the cell represents a set of electronic components in an integrated circuit; identifying, among the plurality of subcells, a most complex subcell; synthesizing a layout of the most complex subcell for each of one or more side-port configurations; selecting a side-port configuration based upon the layout of the most complex subcell; and synthesizing a layout of one or more of the plurality of subcells neighboring the most complex subcell by propagating one or more constraints associated with the selected side-port configuration.

For example, the cell may be a standard cell describing a set of transistor and interconnect structures configured to provide Boolean logic or storage. The most complex subcell may be identified as the subcell, among the plurality of subcells, with the largest number of transistors or interconnections. Synthesizing the layout of the most complex subcell for each of the one or more side-port configurations may include placing each of the plurality of subcells next to the most complex subcell in a linear order. In some cases, the linear order is from most to least degree of complexity.

In some implementations, the one or more side-port configurations may exclude side-port configurations that do not stay within their respective native layers. Additionally or alternatively, the one or more side-port configurations may exclude side-port configurations that do not stay within their respective native regions. Additionally or alternatively, the one or more side-port configurations may exclude side-port configurations that do not meet a maximum cell height requirement.

Synthesizing the layout of the most complex subcell for each of the one or more side-port configurations may include, for each of the plurality of subcells, starting with a farthest one from the most complex subcell: identifying one or more routing regions for each native input/output (I/O) net; identifying one or more routing regions for each feed-through net; performing an exact capacity analysis for each possible assignment of native I/O and feed-through wires in subcells; and enumerating the one or more side-port configurations as those that successfully complete the exact capacity analysis.

In another illustrative, non-limiting embodiment, an integrated circuit may include a cell having a plurality of electronic components, where the cell is partitioned into a plurality of subcells, the plurality of subcells including a most complex subcell, the most complex subcell having a layout synthesized for each of a plurality of side-port configurations, and at least one of the plurality of subcells neighboring the most complex subcell having a layout synthesized by propagating one or more constraints associated with a selected one of the plurality of side-port configurations. For example, the plurality of electronic components may include a set of transistor and interconnect structures configured to provide Boolean logic or storage.

The most complex subcell may have the largest number of transistors or interconnections among the plurality of subcells. The layout of the most complex subcell may be determined, for each of the plurality of side-port configurations, by placing each of the plurality of subcells next to the most complex subcell in a linear order from most to least degree of complexity. The plurality of side-port configurations may exclude side-port configurations that do not stay within their respective native layers, that do not stay within their respective native regions, and that do not meet a cell height requirement.

The layout of the most complex subcell may be determined for each of the plurality side-port configurations and for each of the plurality of subcells, starting with a farthest one from the most complex subcell, by identifying one or more routing regions for each native I/O net, identifying one or more routing regions for each feed-through net, performing an exact capacity analysis for each possible assignment of native I/O and feed-through wires in subcells, and enumerating the one or more side-port configurations as those that successfully complete the exact capacity analysis.

In yet another illustrative, non-limiting embodiment a lithographic mask may include a plurality of geometric patterns corresponding to a cell having a plurality of electronic components, where the plurality of electronic components includes a set of transistor and interconnect structures configured to provide Boolean logic or storage, where the cell is partitioned into a plurality of subcells, the plurality of subcells including a most complex subcell, the most complex subcell having a layout synthesized for each of a plurality of side-port configurations, and at least one of the plurality of subcells neighboring the most complex subcell having a layout synthesized by propagating one or more constraints associated with a selected one of the plurality of side-port configurations.

The most complex subcell may have the largest number of transistors or interconnections among the plurality of subcells. The layout of the most complex subcell may be determined, for each of the plurality of side-port configurations, by placing each of the plurality of subcells next to the most complex subcell in a linear order from most to least degree of complexity. The plurality of side-port configurations may exclude side-port configurations that do not stay within their respective native layers, that do not stay within their respective native regions, and that do not meet a cell height requirement. The layout of the most complex subcell is determined for each of the plurality side-port configurations and for each of the plurality of subcells, starting with a farthest one from the most complex subcell, by identifying one or more routing regions for each native input/output (I/O) net, identifying one or more routing regions for each feed-through net, performing an exact capacity analysis for each possible assignment of native I/O and feed-through wires in subcells, and enumerating the one or more side-port configurations as those that successfully complete the exact capacity analysis.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The term "coupled" is defined as connected, although not necessarily directly, and not necessarily mechanically. The terms "a" and "an" are defined as one or more unless stated otherwise. The terms "comprise" and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. In a computer comprising a processor and a memory coupled to the processor, the memory having program instructions stored thereon that, upon execution by the processor, cause the computer to provide a computer-aided design (CAD) environment, a method comprising:
partitioning a cell into a plurality of subcells, wherein the cell represents a set of electronic components in an integrated circuit;
identifying, among the plurality of subcells, a most complex subcell;
synthesizing a layout of the most complex subcell for each of one or more side-port configurations by, for each of the plurality of subcells, starting with a farthest one from the most complex subcell:
  (a) identifying one or more routing regions for each native input/output (I/O) net;
  (b) identifying one or more routing regions for each feed-through net;
  (c) performing an exact capacity analysis for each possible assignment of native I/O and feed-through wires in subcells; and
  (d) enumerating the one or more side-port configurations as those that successfully complete the exact capacity analysis;
selecting a side-port configuration based upon the layout of the most complex subcell; and
synthesizing a layout of one or more of the plurality of subcells neighboring the most complex subcell by propagating one or more constraints associated with the selected side-port configuration.

2. The method of claim 1, wherein the cell is a standard cell describing a set of transistor and interconnect structures configured to provide Boolean logic or storage.

3. The method of claim 1, wherein the most complex subcell is identified as the subcell, among the plurality of subcells, with the largest number of transistors or interconnections.

4. The method of claim 1, wherein synthesizing the layout of the most complex subcell for each of the one or more side-port configurations comprises placing each of the plurality of subcells next to the most complex subcell in a linear order.

5. The method of claim 4, wherein the linear order is from most to least degree of complexity.

6. The method of claim 4, wherein the one or more side-port configurations exclude side-port configurations that do not stay within their respective native layers.

7. The method of claim 4, wherein the one or more side-port configurations exclude side-port configurations that do not stay within their respective native regions.

8. The method of claim 4, wherein the one or more side-port configurations exclude side-port configurations that do not meet a maximum cell height requirement.

9. An integrated circuit, comprising:
a cell having a plurality of electronic components, wherein the cell is partitioned into a plurality of subcells, the plurality of subcells including a most complex subcell, the most complex subcell having a layout synthesized for each of a plurality of side-port configurations, and at least one of the plurality of subcells neighboring the most complex subcell having a layout synthesized by propagating one or more constraints associated with a selected one of the plurality of side-port configurations, wherein the layout of the most complex subcell is determined for each of the plurality side-port configurations and for each of the plurality of subcells, starting with a farthest one from the most complex subcell, by: (a) identifying one or more routing regions for each native input/output (I/O) net, (b) identifying one or more routing regions for each feed-through net, (c) performing an exact capacity analysis for each possible assignment of native I/O and feed-through wires in subcells, and (d) enumerating the one or more side-port configurations as those that successfully complete the exact capacity analysis.

10. The integrated circuit of claim 9, wherein the plurality of electronic components includes a set of transistor and interconnect structures configured to provide Boolean logic or storage.

11. The integrated circuit of claim 9, wherein the most complex subcell has the largest number of transistors or interconnections among the plurality of subcells.

12. The integrated circuit of claim 9, wherein the layout of the most complex subcell is determined, for each of the plurality of side-port configurations, by placing each of the plurality of subcells next to the most complex subcell in a linear order from most to least degree of complexity.

13. The integrated circuit of claim 12, wherein the plurality of side-port configurations exclude side-port configurations that do not stay within their respective native layers, that do not stay within their respective native regions, and that do not meet a cell height requirement.

14. A lithographic mask, comprising:
a plurality of geometric patterns corresponding to a cell having a plurality of electronic components, wherein the plurality of electronic components includes a set of transistor and interconnect structures configured to provide Boolean logic or storage, wherein the cell is partitioned into a plurality of subcells, the plurality of subcells including a most complex subcell, the most complex subcell having a layout synthesized for each of a plurality of side-port configurations, and at least one of the plurality of subcells neighboring the most complex subcell having a layout synthesized by propagating one or more constraints associated with a selected one of the plurality of side-port configurations, wherein the layout of the most complex subcell is determined for each of the plurality side-port configurations and for each of the plurality of subcells, starting with a farthest one from the most complex subcell, by: (a) identifying one or more routing regions for each native input/output (I/O) net, (b) identifying one or more routing regions for each feed-through net, (c) performing an exact capacity analysis for each possible assignment of native I/O and feed-through wires in subcells, and (d) enumerating the one or more side-port configurations as those that successfully complete the exact capacity analysis.

15. The lithographic mask of claim 14, wherein the most complex subcell has the largest number of transistors or interconnections among the plurality of subcells.

16. The lithographic mask of claim 14, wherein the layout of the most complex subcell is determined, for each of the plurality of side-port configurations, by placing each of the plurality of subcells next to the most complex subcell in a linear order from most to least degree of complexity.

17. The lithographic mask of claim 16, wherein the plurality of side-port configurations exclude side-port configurations that do not stay within their respective native layers, that do not stay within their respective native regions, and that do not meet a cell height requirement.

\* \* \* \* \*